United States Patent
Wan

(10) Patent No.: US 12,488,210 B2
(45) Date of Patent: Dec. 2, 2025

(54) CODE SCANNING IDENTIFICATION

(71) Applicant: Alipay (Hangzhou) Information Technology Co., Ltd., Zhejiang (CN)

(72) Inventor: Xuyang Wan, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/787,951

(22) Filed: Jul. 29, 2024

(65) Prior Publication Data

US 2024/0386228 A1    Nov. 21, 2024

Related U.S. Application Data

(63) Continuation of application No. PCT/CN2023/071214, filed on Jan. 9, 2023.

(30) Foreign Application Priority Data

Jan. 30, 2022   (CN) .......................... 202210114197.6

(51) Int. Cl.
  *G06K 7/14*   (2006.01)
(52) U.S. Cl.
  CPC ......... *G06K 7/1417* (2013.01); *G06K 7/1413* (2013.01)
(58) Field of Classification Search
  CPC .. G06K 7/0004; G06K 7/1404; G06K 7/1413; G06K 7/1417; G06K 2007/10524
  See application file for complete search history.

(56) References Cited

U.S. PATENT DOCUMENTS

| | | | |
|---|---|---|---|
| 5,340,971 A | | 8/1994 | Rockstein et al. |
| 2021/0117953 A1 | | 4/2021 | Irukula et al. |
| 2021/0133410 A1 | | 5/2021 | Wang et al. |

FOREIGN PATENT DOCUMENTS

| | | | |
|---|---|---|---|
| CN | 203433528 U | * | 2/2014 |
| CN | 205959313 U | | 2/2017 |
| CN | 107315981 A | | 11/2017 |
| CN | 109271827 A | | 1/2019 |
| CN | 208422016 U | | 1/2019 |
| CN | 110070684 A | | 7/2019 |
| CN | 210515310 U | | 5/2020 |
| CN | 211699107 U | | 10/2020 |
| CN | 112349045 A | | 2/2021 |
| CN | 112749575 A | | 5/2021 |
| CN | 112799511 A | | 5/2021 |
| CN | 113935349 A | | 1/2022 |

(Continued)

*Primary Examiner* — Laura A Gudorf
(74) *Attorney, Agent, or Firm* — Seed IP Law Group LLP

(57) ABSTRACT

Implementations of the present specification disclose a code scanning identification method, apparatus, and device, and a medium. The solution includes: obtaining a sensing signal obtained by a sensing module through detection; determining whether a value corresponding to the sensing signal satisfies a determined state condition, to obtain a determining result; and enabling a code scanning module corresponding to a target working mode to perform code scanning identification in response to that the determining result indicates that the value corresponding to the sensing signal satisfies the determined state condition, where the code scanning module corresponding to the target working mode is a first code scanning module or a second code scanning module.

20 Claims, 3 Drawing Sheets

(56) References Cited

FOREIGN PATENT DOCUMENTS

| | | |
|---|---|---|
| CN | 114444527 A | 5/2022 |
| CN | 217060988 U | 7/2022 |
| KR | 20210071553 A | 6/2021 |
| KR | 102368482 B1 | 2/2022 |
| WO | 2020218542 A1 | 10/2020 |
| WO | 2023142990 A1 | 8/2023 |

* cited by examiner

CODE SCANNING IDENTIFICATION

TECHNICAL FIELD

The present application relates to the field of computer technologies, and in particular, to code scanning identification.

BACKGROUND

As input devices, code scanning devices such as code scanning guns can input image codes such as barcodes and two-dimensional codes on commodities to computers. In some implementations, the code scanning devices are devices frequently used in business places such as stores, and implement statistical management on commodities, processing of payment procedures, etc. Generally, code scanning tools configured in checkout counters in stores, etc. are usually handheld or fixed code scanning tools, and can only scan payment codes. When users need to collect statistics about commodities, other code scanning tools need to be used, which bring some inconvenience to the users.

SUMMARY

Implementations of the present specification provide a code scanning identification method, apparatus, device, and a medium, to improve convenience of code scanning identification.

An implementation of the present specification provides a code scanning identification method, applied to a code scanning tool. The code scanning tool includes a code scanning part and a handheld part, the code scanning part includes a first code scanning module and a second code scanning module, a first angle is formed between a first top surface of the code scanning part in which the first code scanning module is located and a second top surface of the handheld part, one side of the first top surface is connected to the second top surface, another side opposite to the one side of the first top surface is connected to a first side surface of the code scanning part, the second code scanning module is disposed on the first side surface of the code scanning part, and the code scanning tool further includes a sensing module. The method includes: obtaining a sensing signal obtained by the sensing module through detection; determining whether a value corresponding to the sensing signal satisfies a determined state condition, to obtain a determining result, where the determined state condition includes a theoretical value range corresponding to the sensing signal obtained by the sensing module through detection when the code scanning tool is in a target working mode; and enabling a code scanning module corresponding to the target working mode to perform code scanning identification when the determining result indicates that the value corresponding to the sensing signal satisfies the determined state condition, where the code scanning module corresponding to the target working mode is the first code scanning module or the second code scanning module.

An implementation of the present specification provides a code scanning identification apparatus, applied to a code scanning tool. The code scanning tool includes a code scanning part and a handheld part, the code scanning part includes a first code scanning module and a second code scanning module, a first angle is formed between a first top surface of the code scanning part in which the first code scanning module is located and a second top surface of the handheld part, one side of the first top surface is connected to the second top surface, another side opposite to the one side of the first top surface is connected to a first side surface of the code scanning part, the second code scanning module is disposed on the first side surface of the code scanning part, and the code scanning tool further includes a sensing module. The apparatus includes: a sensing signal acquisition module, configured to obtain a sensing signal obtained by the sensing module through detection; a condition determining module, configured to determine whether a value corresponding to the sensing signal satisfies a determined state condition, to obtain a determining result, where the determined state condition includes a theoretical value range corresponding to the sensing signal obtained by the sensing module through detection when the code scanning tool is in a target working mode; and a scanning module enabling module, configured to enable a code scanning module corresponding to the target working mode to perform code scanning identification when the determining result indicates that the value corresponding to the sensing signal satisfies the determined state condition, where the code scanning module corresponding to the target working mode is the first code scanning module or the second code scanning module.

An implementation of the present specification provides a code scanning identification device, and the device is applied to a code scanning tool. The code scanning tool includes a code scanning part and a handheld part, the code scanning part includes a first code scanning module and a second code scanning module, a first angle is formed between a first top surface of the code scanning part in which the first code scanning module is located and a second top surface of the handheld part, one side of the first top surface is connected to the second top surface, another side opposite to the one side of the first top surface is connected to a first side surface of the code scanning part, the second code scanning module is disposed on the first side surface of the code scanning part, and the code scanning tool further includes a sensing module. The device includes at least one processor and a memory communicatively connected to the at least one processor. The memory stores instructions that can be executed by the at least one processor, and the instructions are executed by the at least one processor to enable the at least one processor to: obtain a sensing signal obtained by the sensing module through detection; determine whether a value corresponding to the sensing signal satisfies a determined state condition, to obtain a determining result, where the determined state condition includes a theoretical value range corresponding to the sensing signal obtained by the sensing module through detection when the code scanning tool is in a target working mode; and enable a code scanning module corresponding to the target working mode to perform code scanning identification when the determining result indicates that the value corresponding to the sensing signal satisfies the determined state condition, where the code scanning module corresponding to the target working mode is the first code scanning module or the second code scanning module.

An implementation of the present specification provides a computer-readable medium. The computer-readable medium stores computer-readable instructions, and the computer-readable instructions can be executed by a processor to implement a code scanning identification method.

In the implementations of the present specification, the following beneficial effects can be achieved: According to the code scanning identification method provided in the implementations of the present specification, the first code scanning module or the second code scanning module in the code scanning tool can be started based on the sensing signal of the sensing module in the code scanning tool, so that the code scanning tool can automatically adapt to a requirement, thereby simplifying user operations.

In another aspect, the code scanning tool in the implementations of the present specification includes two code scanning modules, which can also satisfy code scanning requirements of a user in different places. In addition, when the first code scanning module is located on a top surface of the code scanning part, and the code scanning tool is placed at a position such as a checkout counter, it can be more in line with consumers' usage habits, thereby improving convenience of use. When the second code scanning module is located on a side surface of the code scanning part, it is more convenient for clerks to hold the code scanning tool for use, thereby improving convenience of a user who performs code scanning identification.

DESCRIPTION OF IMPLEMENTATIONS

Figure 1:
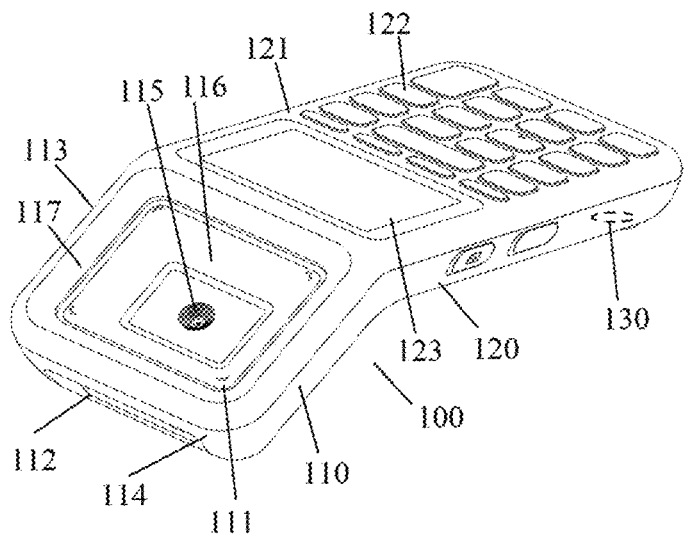
FIG. 1 is a schematic diagram illustrating a code scanning tool according to an implementation of the present specification.

FIG. 1 is a schematic diagram illustrating a code scanning tool according to an implementation of the present specification. As shown in FIG. 1, the code scanning tool 100 can include a code scanning part 110 and a handheld part 120. The code scanning part 110 can include a first code scanning module 111 and a second code scanning module 112. A first angle is formed between a first top surface 113 of the code scanning part in which the first code scanning module 111 is located and a second top surface 121 of the handheld part. One side of the first top surface 113 is connected to the second top surface 121. Another side opposite to the one side of the first top surface 113 is connected to a first side surface 114 of the code scanning part. The second code scanning module 112 is disposed on the first side surface 114 of the code scanning part.

As shown in FIG. 1, the code scanning tool provided in some implementations of the present specification further includes a sensing module 130. The sensing module 130 can be located inside the code scanning tool, or can be located on a housing of the code scanning tool. In some implementations of the present specification, the first code scanning module and the second code scanning module can be controlled to perform code scanning identification based on a sensing signal obtained by the sensing module through detection.

In some implementations of the present specification, the first code scanning module 111 can be configured to identify a first to-be-identified image in a first distance range, and the second code scanning module 112 can be configured to identify a second to-be-identified image in a second distance range, where a minimum distance value of the first distance range can be less than a minimum distance value of the second distance range. In some implementations, when payment is performed, the first code scanning module can be used to identify a payment code provided by a consumer at a close distance; and when statistics about commodities are collected, the second code scanning module can be used to identify a commodity barcode at a relatively long distance, so as to satisfy code scanning requirements of a user in different places.

In addition, when the first code scanning module is located on a top surface of the code scanning part, and the code scanning tool is placed in a position such as a checkout counter, there can be a certain angle between the first code scanning module and a placement surface, and it can be more in line with consumers' usage habits, thereby improving convenience of use. When the second code scanning module is located on a side surface of the code scanning part, it is more convenient for clerks to hold the code scanning tool for use.

As shown in FIG. 1, there is a certain angle between the code scanning part and the handheld part of the code scanning tool in some implementations of the present specification. For ease of use, when the code scanning tool in some implementations of the present specification is placed on a placement surface, a tilt angle of the first top surface relative to the placement surface can be less than or equal to 50 degrees. An angle between a bottom surface of the handheld part and the placement surface can be less than or equal to 20 degrees.

In some implementations, in some implementations of the present specification, the tilt angle of the first top surface relative to the placement surface can be within 45 degrees, and the angle between the bottom surface of the handheld part and the placement surface can be within 18.5 degrees. In some implementations, tilt angles of the code scanning part and the handheld part can be determined in combination with thickness of a side surface of the code scanning tool. Example content is not limited herein.

Next, a code scanning identification method provided in the implementations of the present specification is for example described with reference to the accompanying drawings.

Figure 2:
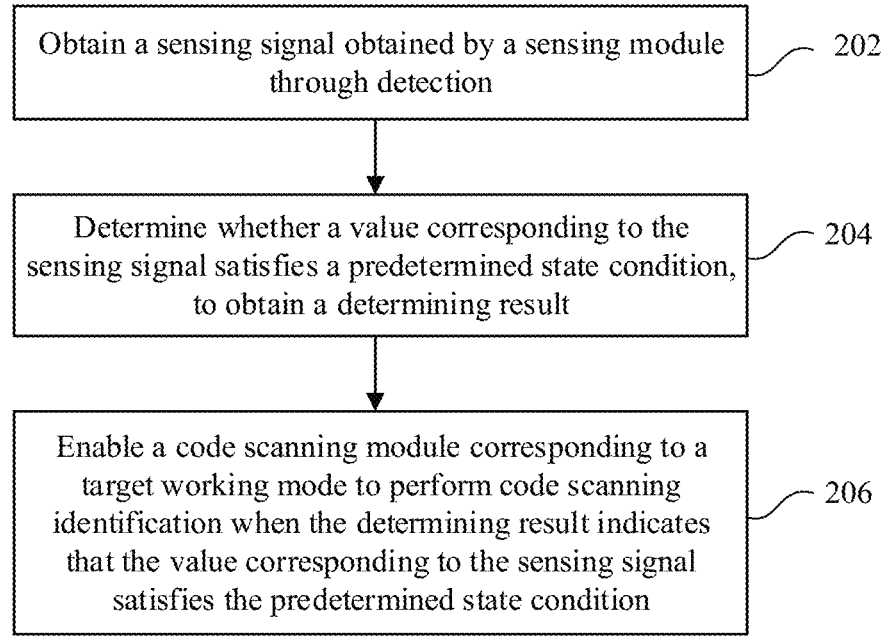
FIG. 2 is a schematic flowchart illustrating a code scanning identification method according to an implementation of the present specification.

FIG. 2 is a schematic flowchart illustrating a code scanning identification method according to an implementation of the present specification. From a program perspective, the procedure can be executed by a program or an application client residing on an application server. From a hardware perspective, the procedure can be executed by a controller or a processor of the code scanning tool shown in FIG. 1. A server may include one or more physical servers communicatively coupled together in a distributed computing configuration, or one or more virtual servers supported by one or more host computing machines. A program or an application client can include execution codes stored on one or more storage devices of the server(s) and may be executed by one or more processors, physical and/or virtual, individually or collectively. Two or more processors may execute execution codes to perform same acts or different acts to collectively implement a procedure. In a collective implementation of a procedure by two more processors, the two or more processors each may perform all the acts or operations of the procedure or may perform some but not all acts or operations of the procedure, and different processors may perform different acts or operations.

As shown in FIG. 2, the procedure can include the following operations: Operation 202: Obtain a sensing signal obtained by the sensing module through detection.

The code scanning tool in some implementations of the present specification can include a sensing module, which can be configured to detect a sensing signal. The sensing signal can reflect a position state of the code scanning tool.

Operation 204: Determine whether a value corresponding to the sensing signal satisfies a determined state condition, to obtain a determining result, where the determined state condition includes a theoretical value range corresponding to the sensing signal obtained by the sensing module through detection when the code scanning tool is in a target working mode. In the description herein, a determined value, state, condition, or threshold means that the value, state, condition, or threshold is determined before the same is used for the relevant operation or decision making, and does not mean that the value, state, condition, or threshold is fixed and cannot be adjusted. A determined value, state, condition, or threshold can be dynamically determined and adjusted and can be continuously updated through machine learning and training in the performance of the relevant procedures.

Operation 206: Enable a code scanning module corresponding to the target working mode to perform code scanning identification when the determining result indicates that the value corresponding to the sensing signal satisfies the determined state condition, where the code scanning module corresponding to the target working mode is the first code scanning module or the second code scanning module.

The code scanning tool in some implementations of the present specification can serve as a handheld tool to perform code scanning identification, or can be placed at a position such as a desktop as a fixed tool to perform code scanning identification. The two code scanning modules in the code scanning tool can respectively correspond to different working modes. In some implementations, when the code scanning tool is placed in a placement position such as a desktop and is in a non-handheld state, the first code scanning module can be enabled to perform code scanning identification; and when a user holds the code scanning tool to perform code scanning identification, the code scanning tool is in a handheld state, and the second code scanning module can be started to perform code scanning identification.

In some implementations of the present specification, a working mode of the code scanning tool can be determined based on a first sensing signal obtained by the sensing module through detection, and the first code scanning module or the second code scanning module is correspondingly enabled to perform code scanning identification.

According to the code scanning identification method provided in some implementations of the present specification, the first code scanning module or the second code scanning module in the code scanning tool can be started based on the sensing signal of the sensing module in the code scanning tool, so that the code scanning tool can automatically adapt to a requirement, thereby simplifying user operations. In addition, the code scanning tool in the implementations of the present specification includes two code scanning modules, which can also satisfy code scanning requirements of a user in different places, thereby improving convenience of a user who performs code scanning identification.

It should be understood that in the method described in one or more implementations of the present specification, the order of some operations can be exchanged based on actual needs, or some operations can be omitted or deleted.

Based on the method in FIG. 2, the implementations of the present specification further provide some example implementations of the method.

In some implementations of the present specification, the sensing module can include a sensor, and the working mode of the code scanning tool can be determined based on a sensing signal obtained by the sensor.

In some implementations, in some implementations of the present specification, the code scanning module corresponding to the target working mode can be the first code scanning module, and the sensing module includes an acceleration sensor (or "accelerometer"). The determining whether the value corresponding to the sensing signal satisfies the determined state condition can include: determining whether an acceleration value obtained by the acceleration sensor through detection is less than or equal to a first determined acceleration threshold. The enabling the code scanning module corresponding to the target working mode to perform code scanning identification when the determining result indicates that the value corresponding to the sensing signal satisfies the determined state condition can include: enabling the first code scanning module to perform code scanning identification if the acceleration value obtained by the acceleration sensor through detection is less than or equal to the first determined acceleration threshold.

In some implementations, in a process in which a user picks up the code scanning tool to perform code scanning, the code scanning tool is movable and has an example acceleration. When the code scanning tool is placed on a fixed placement surface such as a checkout counter, the code scanning tool is relatively still, and in this case, the acceleration is very small, or even close to zero. The code scanning tool in some implementations of the present specification can include the acceleration sensor, and it is determined, based on the sensing signal detected by the acceleration sensor, whether the code scanning tool is placed on a fixed placement surface such as a checkout counter. When the acceleration value obtained by the acceleration sensor through detection is less than or equal to the first determined acceleration threshold, it can be determined that the code scanning tool is placed on a placement surface and is in a non-handheld state, and the first code scanning module can be enabled to perform code scanning identification.

In some implementations, when the code scanning tool is placed on a placement surface, because of gravity, an example pressure exists between the code scanning tool and the placement surface, in some implementations of the present specification, whether the code scanning tool is in a non-handheld state can also be determined based on pressure sensing information. In some implementations, in some implementations of the present specification, the code scanning module corresponding to the target working mode is the first code scanning module, and the sensing module includes a pressure sensor. The pressure sensor can be located at a position where the code scanning tool is in contact with the placement surface, for example, can be located at a bottom of the code scanning tool.

The determining whether the value corresponding to the sensing signal satisfies the determined state condition can include: determining whether a pressure value obtained by the pressure sensor through detection is greater than or equal to a first determined pressure threshold. The enabling the code scanning module corresponding to the target working mode to perform code scanning identification when the determining result indicates that the value corresponding to the sensing signal satisfies the determined state condition includes: enabling the first code scanning module to perform code scanning identification if the pressure value obtained by the pressure sensor through detection is greater than or equal to the first determined pressure threshold.

In some implementations, an outer surface of the handheld part of the code scanning tool can also include a pressure sensor, which is configured to sense a pressure between the code scanning tool and a user's hand when the user holds the code scanning tool. When the user holds the code scanning tool, and the pressure sensor can detect an example pressure, it can be determined that the code scanning tool is in a handheld state, and the second code scanning module can be enabled to perform code scanning identification. When the pressure value detected by the code scanning tool is small or even zero, it can be determined that the code scanning tool is in a non-handheld state, and the first code scanning module can be enabled to perform code scanning identification.

Considering that in some implementations, when a user holds the code scanning tool to perform code scanning, the code scanning tool is in contact with the user's hand. In addition, the user's hand has a certain temperature. In some implementations of the present specification, the working state of the code scanning module can alternatively or additionally be determined based on a temperature signal. In some implementations, in some implementations of the present specification, the code scanning module corresponding to the target working mode is the first code scanning module, and the sensing module can include a temperature sensor. The determining whether the value corresponding to the sensing signal satisfies the determined state condition can include: determining whether a temperature value obtained by the temperature sensor through detection is less than or equal to a first determined temperature threshold. The enabling the code scanning module corresponding to the target working mode to perform code scanning identification when the determining result indicates that the value corresponding to the sensing signal satisfies the determined state condition can include: enabling the first code scanning module to perform code scanning identification if the temperature value obtained by the temperature sensor through detection is less than or equal to the first determined temperature threshold.

In some implementations of the present specification, the temperature sensor can be located on the outer surface of the handheld part, or can be distributed at a plurality of positions, to improve detection accuracy. For example, the temperature sensor can be located at a position such as a bottom surface or a side surface of the handheld part. In some implementations, an example installation position can be set based on a requirement, which is not specifically limited herein.

In some implementations, when the code scanning tool is placed on a placement surface, a surrounding temperature is an ambient temperature. The ambient temperature is usually lower than a human body temperature, and the first determined temperature threshold can be set based on the human body temperature. When the temperature value obtained by the temperature sensor through detection is less than or equal to the first determined temperature threshold, it can be determined that the code scanning tool is placed on the placement surface and is in a non-handheld state, and the first code scanning module can be enabled to perform code scanning identification.

In some implementations of the present specification, it can alternatively or additionally be determined whether the code scanning tool is on a placement surface based on a distance between the code scanning tool and the placement surface, to control the working state of the code scanning module. In some implementations, in some implementations of the present specification, the code scanning module corresponding to the target working mode is the first code scanning module, and the sensing module can include a distance sensor. The determining whether the value corresponding to the sensing signal satisfies the determined state condition can include: determining whether a distance value obtained by the distance sensor through detection is less than or equal to a first determined distance threshold. The enabling the code scanning module corresponding to the target working mode to perform code scanning identification when the determining result indicates that the value corresponding to the sensing signal satisfies the determined state condition includes: enabling the first code scanning module to perform code scanning identification if the distance value obtained by the distance sensor through detection is less than or equal to the first determined distance threshold.

In some implementations, the distance sensor can include an infrared sensor, which can be located at a bottom of the code scanning tool, and is configured to detect a distance between the code scanning tool and a placement surface. When the distance between the code scanning tool and the placement surface is relatively short, it can be determined that the code scanning tool is placed on the placement surface and is in a non-handheld state, and the first code scanning module can be enabled to perform code scanning identification.

The code scanning tool in some implementations of the present specification can further include a distance sensor configured to detect a distance between a user's hand and the code scanning tool, and the distance sensor can be located on a side surface of the code scanning tool. When a user picks up the code scanning tool, it can be determined, by using a signal of the distance sensor, that the user is approaching the code scanning tool. When the distance value detected by the distance sensor is relatively small, it can be determined that the user holds the code scanning tool; and when the code scanning tool is placed on a placement surface, the distance value detected by the distance sensor is relatively large, and the first code scanning module can be enabled. In some implementations, a determining condition for enabling a module can be set based on a position, a type, etc. of a sensor. Example content is not listed one by one herein.

In some implementations, in a process in which a user holds the code scanning tool, the code scanning tool can be tilted at a certain angle. In some implementations of the present specification, the working state of the code scanning module can alternatively or additionally be determined based on an angle of the code scanning tool. In some implementations, in some implementations of the present specification, the code scanning module corresponding to the target working mode is the first code scanning module, and the sensing module can include an angle sensor. The determining whether the value corresponding to the sensing signal satisfies the determined state condition can include: determining whether an angle value obtained by the angle sensor through detection is less than or equal to a first determined angle threshold. The enabling the code scanning module corresponding to the target working mode to perform code scanning identification when the determining result indicates that the value corresponding to the sensing signal satisfies the determined state condition can include: enabling the first code scanning module to perform code scanning identification if the angle value obtained by the angle sensor through detection is less than or equal to the first determined angle threshold.

In some implementations, an angle at which the code scanning tool is placed on a placement surface can be determined as a reference angle. When the code scanning tool is placed on the placement surface, a tilt angle of the code scanning tool is relatively small; and when the code scanning tool is picked up, the code scanning tool generates a relatively large tilt angle, and enabling of the code scanning module can be controlled based on the angle value obtained by the angle sensor through detection. Angle data detected by the angle sensor can alternatively or additionally be a difference between angles of the code scanning tool at two moments. When the angle difference is relatively large, it can be determined that the code scanning tool is in a moving state, is not on a placement surface, and is in a handheld state; and when the angle difference is relatively small, it can be determined that the code scanning tool is relatively still, located on a placement surface, and in a non-handheld state.

Similarly, the code scanning module corresponding to the target working mode in some implementations of the present specification can alternatively or additionally be the second code scanning module of the code scanning tool, and a working state of the second code scanning module can also be controlled by using a sensing signal detected by a sensor such as an acceleration sensor, a pressure sensor, a temperature sensor, a distance sensor, or an angle sensor.

In some implementations, in some implementations of the present specification, the code scanning module corresponding to the target working mode can be the second code scanning module, and the sensing module can include an acceleration sensor. The determining whether the value corresponding to the sensing signal satisfies the determined state condition can include: determining whether an acceleration value obtained by the acceleration sensor through detection is greater than or equal to a second determined acceleration threshold. The enabling the code scanning module corresponding to the target working mode to perform code scanning identification when the determining result indicates that the value corresponding to the sensing signal satisfies the determined state condition can include: enabling the second code scanning module to perform code scanning identification if the acceleration value obtained by the acceleration sensor through detection is greater than or equal to the second determined acceleration threshold.

In some implementations, when a user picks up the code scanning tool placed at a position such as a desktop, the code scanning tool generates an example acceleration, and in a process in which the user holds the code scanning tool, the code scanning tool usually moves. Therefore, in some implementations of the present specification, the acceleration of the code scanning tool can be detected based on the acceleration sensor. When the acceleration value is greater than or equal to the second determined acceleration threshold, the second code scanning module can be enabled to perform code scanning identification.

In some implementations, in some implementations of the present specification, the code scanning module corresponding to the target working mode can be the second code scanning module, and the sensing module can include a pressure sensor. The determining whether the value corresponding to the sensing signal satisfies the determined state condition can include: determining whether a pressure value obtained by the pressure sensor through detection is less than or equal to a second determined pressure threshold. The enabling the code scanning module corresponding to the target working mode to perform code scanning identification when the determining result indicates that the value corresponding to the sensing signal satisfies the determined state condition can include: enabling the second code scanning module to perform code scanning identification if the pressure value obtained by the pressure sensor through detection is less than or equal to the second determined acceleration threshold.

The pressure sensor can detect a pressure between the code scanning tool and a placement surface. When a user holds the code scanning tool, the pressure between the code scanning tool and the placement surface is relatively small, which can be approximately understood as zero, and the second code scanning module can be enabled to perform code scanning identification.

In some implementations, an outer surface of the handheld part of the code scanning tool can also include a pressure sensor, which is configured to detect a pressure between the code scanning tool and a user' hand when the user holds the code scanning tool. When the user holds the code scanning tool, and the pressure sensor can detect an example pressure, for example, when the pressure value detected by the pressure sensor is greater than or equal to a third determined pressure threshold, it can be determined that the code scanning tool is in a handheld state, and the second code scanning module can be enabled to perform code scanning identification.

In some implementations, in the present specification, the code scanning module corresponding to the target working mode is the second code scanning module, and the sensing module can include a temperature sensor. The determining whether the value corresponding to the sensing signal satisfies the determined state condition can include: determining whether a temperature value obtained by the temperature sensor through detection is greater than or equal to a second determined temperature threshold. The enabling the code scanning module corresponding to the target working mode to perform code scanning identification when the determining result indicates that the value corresponding to the sensing signal satisfies the determined state condition can include: enabling the second code scanning module to perform code scanning identification if the temperature value obtained by the temperature sensor through detection is greater than or equal to the second determined temperature threshold.

In some implementations, the temperature sensor can detect a temperature of a hand holding the code scanning tool. When the temperature value obtained by the temperature sensor through detection is greater than or equal to the second determined temperature threshold, it can be determined that the code scanning tool is in a handheld state, and the second code scanning module can be enabled to perform code scanning identification. The second determined temperature threshold can be determined based on a human body temperature and an ambient temperature.

In some implementations, in some implementations of the present specification, the code scanning module corresponding to the target working mode can be the second code scanning module, and the sensing module can include a distance sensor. The determining whether the value corresponding to the sensing signal satisfies the determined state condition can include: determining whether a distance value obtained by the distance sensor through detection is greater than or equal to a second determined distance threshold. The enabling the code scanning module corresponding to the target working mode to perform code scanning identification when the determining result indicates that the value corresponding to the sensing signal satisfies the determined state condition can include: enabling the second code scanning module to perform code scanning identification if the distance value obtained by the distance sensor through detection is greater than or equal to the second determined distance threshold.

In some implementations of the present specification, the distance sensor can include an infrared sensor, and can be located at a bottom of the code scanning tool. When a user holds the code scanning tool, the distance sensor can detect a distance between the code scanning tool and a position such as the ground or a desktop. If the distance value obtained by the distance sensor through detection is greater than or equal to the second determined distance threshold, it can be determined that the code scanning tool is in a handheld state, and the second code scanning module can be enabled to perform code scanning identification.

The distance sensor in some implementations of the present specification can further include a distance sensor configured to detect a user's hand and the code scanning tool, and the distance sensor can be located on a side surface of the code scanning tool. When the user picks up the code scanning tool, it can be determined, by using a signal of the distance sensor, that the user is approaching the code scanning tool. When the distance value detected by the distance sensor is relatively small, that is, if the distance value obtained by the distance sensor through detection is less than or equal to a third determined distance threshold, it can be determined that the user holds the code scanning tool, or the second code scanning module can be enabled to perform code scanning identification.

In some implementations of the present specification, the working state of the second code scanning module can alternatively or additionally be controlled based on a sensing signal of an angle sensor. The code scanning module corresponding to the target working mode can be the second code scanning module, and the sensing module can include an angle sensor. The determining whether the value corresponding to the sensing signal satisfies the determined state condition can include: determining whether an angle value obtained by the angle sensor through detection is greater than or equal to a second determined angle threshold.

The enabling the code scanning module corresponding to the target working mode to perform code scanning identification when the determining result indicates that the value corresponding to the sensing signal satisfies the determined state condition can include: enabling the second code scanning module to perform code scanning identification if the angle value obtained by the angle sensor through detection is greater than or equal to the second determined angle threshold.

To improve stability of the working mode of the code scanning tool, in some implementations of the present specification, duration in which implementation value corresponding to implementation sensing signal satisfies implementation determined state condition can be further detected. When the duration satisfies a determined duration condition, a corresponding code scanning module can be enabled to perform code scanning identification.

For example, when the acceleration value obtained by the acceleration sensor through detection is less than or equal to the first determined acceleration threshold, and duration in which the acceleration value obtained by the acceleration sensor through detection is less than or equal to the first determined acceleration threshold is greater than first determined duration, it can be determined that the code scanning tool is in a non-handheld state, and the first code scanning module can be enabled to perform code scanning identification.

For another example, when the acceleration value obtained by the acceleration sensor through detection is greater than or equal to the second determined acceleration threshold, and duration in which the acceleration value obtained by the acceleration sensor through detection is greater than or equal to the first determined acceleration threshold is greater than second determined duration, it can be determined that the code scanning tool is in a handheld state, and the second code scanning module can be enabled to perform code scanning identification.

In some implementations of the present specification, the code scanning tool can include one sensor, or can include a plurality of sensors. Specifically, the sensing module in some implementations of the present specification can include at least one of the acceleration sensor, the pressure sensor, the temperature sensor, the distance sensor, and the angle sensor. To improve stability of the code scanning tool, the target working mode of the code scanning tool can be determined in combination with the sensing signals detected by a plurality of sensors.

It can be understood that an example value of a determined condition such as the determined acceleration threshold, the determined pressure threshold, the determined distance threshold, and the determined angle threshold can be set based on an actual requirement, which is not specifically limited herein.

As shown in FIG. 1, the first code scanning module of the code scanning tool can include a first camera 115, and the first top surface of the code scanning part includes a camera lens 116 configured to protect the first camera. The first top surface can include a top surface opening, the camera lens 116 can be fastened in the top surface opening, and light outside the code scanning tool can enter the first camera through the top surface opening, so that the first camera can capture an image located near the first top surface. A cup cover can be further included between the first camera and the camera lens, to improve an effect of capturing an image by the first camera, and also protect an internal structure of the code scanning tool.

The cup cover in some implementations of the present specification can include a tapered housing. The tapered housing is a housing shape with a small bottom and a large top similar to a bowl shape. A first opening at a bottom of the tapered housing can be connected to the first code scanning module, so that the light outside the code scanning tool enters a lens of the first code scanning module, and the first camera can capture a to-be-identified image through the first opening. A second opening on a top of the tapered housing can be connected to the top surface opening on the first top surface. The light outside the code scanning tool enters the first code scanning module through the top surface opening, the second opening, and the first opening. An area of the first opening is less than an area of the second opening.

To provide convenience for use by a user, in the instance in the present specification, the camera lens 116 can be a color-variable isolation screen. When the code scanning tool is in a non-handheld state, light transmittance of the isolation screen can be greater than or equal to first light transmittance. When the code scanning tool is in a handheld state, the light transmittance of the isolation screen can be less than or equal to second light transmittance. The first light transmittance can be greater than the second light transmittance. In some implementations, the first light transmittance can be 60% to 100%, and the second light transmittance can be 0% to 30%.

In some implementations, when the code scanning tool is in a handheld state, the light transmittance of the isolation screen can be less than or equal to 20%; and when the code scanning tool is in a non-handheld state, the light transmittance of the isolation screen can be greater than or equal to 80%. Therefore, when the code scanning tool is held to perform code scanning, the isolation screen can shield light entering the first code scanning module, and the second code scanning module is used to perform code scanning. When the code scanning tool is in a non-handheld state on a fixture object such as a desktop, the first code scanning module can be used to collect an image.

In some implementations, the code scanning tool in some implementations of the present specification can further include an isolation screen. The isolation screen can be located on the first top surface. After the obtaining the determining result, the method can further include: controlling light transmittance of the isolation screen when the determining result indicates that the value corresponding to the sensing signal satisfies the determined state condition.

The isolation screen can present different isolation states for the working states of the two code scanning modules.

In some implementations, in some implementations of the present specification, the code scanning module corresponding to the target working mode is the first code scanning module. The controlling the light transmittance of the isolation screen when the determining result indicates that the value corresponding to the sensing signal satisfies the determined state condition can include: controlling the light transmittance of the isolation screen to be greater than or equal to first light transmittance when the determining result indicates that the value corresponding to the sensing signal satisfies a first determined state condition, where the first light transmittance is greater than or equal to 60%. The first determined condition can indicate a condition for enabling the first code scanning module to perform code scanning identification when the code scanning tool is in a non-handheld state.

In some implementations, in some implementations of the present specification, the code scanning module corresponding to the target working mode can be the first code scanning module. The controlling the light transmittance of the isolation screen when the determining result indicates that the value corresponding to the sensing signal satisfies the determined state condition can include: controlling the light transmittance of the isolation screen to be less than or equal to second light transmittance when the determining result indicates that the value corresponding to the sensing signal satisfies a second determined state condition, where the second light transmittance is less than or equal to 30%. The second determined condition can indicate a condition for enabling the second code scanning module to perform code scanning identification when the code scanning tool is in a handheld state.

In some implementations of the present specification, the code scanning tool further includes an indicator lamp, and the indicator lamp is located on the first top surface. After the obtaining the determining result, the method further includes: controlling the indicator lamp to flash at a determined frequency when the determining result indicates that the value corresponding to the sensing signal satisfies the determined state condition. The indicator lamp can be configured to indicate a user to perform code scanning identification by using a code scanning module in an available state in the code scanning tool.

The indicator lamp in some implementations of the present specification can include a light-emitting lamp ring. As shown in FIG. 1, the code scanning part of the code scanning tool provided in some implementations of the present specification can further include a light-emitting lamp ring 117. The light-emitting lamp ring 117 can be located around the opening on the top surface of the first top surface, and can be configured to indicate a user to display a two-dimensional code at the position. In some implementations, when the first code scanning module is in a state available for work, the light-emitting lamp ring can emit light of a first determined color at a first determined frequency, to indicate the user to scan a code at the code scanning tool. When the code scanning succeeds, the light-emitting lamp ring can also emit light of a second determined color at a second determined frequency, to prompt the user that the code scanning succeeds; and when the code scanning fails, the light-emitting lamp ring can also emit light of a third determined color at a third determined frequency, to prompt the user that the code scanning fails.

As shown in FIG. 1, the handheld part of the code scanning tool in some implementations of the present specification can include a button component 122 and a display component 123. The button component and the display component are located on a second top surface of the handheld part. The button component includes a first button, configured to control the code scanning tool to obtain a to-be-identified image.

In some implementations, to avoid unnecessary image disturbance, when a user needs to use the code scanning tool to scan a code, the user can first tap the first button or keep the first button in an operated state, and then scan the code. For example, when the user uses the code scanning tool to scan a barcode on a commodity to be stocked in, the user can tap or touch and hold the first button to execute a code scanning procedure. When the user taps the first button again or after the user releases the first button, the code scanning part can no longer collect an image.

In some implementations of the present specification, the button component can include several buttons, and can include a function button, or can include a numeric button. To help a user view a product, the button component can include a commodity button configured to manage commodity management in a commodity library, for example, viewing a number of commodities in the commodity library, unit prices of the commodities, and a total price of the commodities; can include an order button configured to view order details of a certain transaction, where for example, the order details of the transaction can be obtained by using the button; can include a statistics collection button configured to view statistical information, where for example, statistical information of commodities that are stocked in during a certain period of time can be viewed; or can include a menu button, etc. that are configured to view functions of a system.

In some implementations, the code scanning identification method provided in some implementations of the present specification can further include: obtaining a function instruction, where the function instruction is generated based on an operation user activates the function button in the code scanning tool; sending a function information acquisition request based on the function instruction; and obtaining function information corresponding to the function instruction.

The function button includes any one of a commodity button configured to manage commodity management in a commodity library, an order button configured to view order details of a certain transaction, a statistics collection button configured to view statistical information, and a menu button configured to view functions of a system.

To avoid that the target working mode determined based on the sensing signal obtained by the sensing module through detection is incorrect, and to enable a user to more conveniently perform code scanning identification by using the code scanning module in the code scanning tool, the code scanning tool in some implementations of the present specification can further include a code scanning module switching control, and the code scanning module switching control can be used to switch between the two code scanning modules for use. For example, when the first code scanning module is in a state available for work, the code scanning module switching control can be used to switch the first code scanning module to a state unavailable for work, and switch the second code scanning module to a state available for work, and a to-be-identified image can be captured by using the second code scanning module. Similarly, when the second code scanning module is in a state available for work, the code scanning module switching control can be used to switch the second code scanning module to a state unavailable for work, and switch the first code scanning module to a state available for work, and a to-be-identified image can be captured by using the first code scanning module.

The code scanning module switching control can be a button in the button component, or can be a button independently disposed on a side surface of the code scanning tool. In some implementations, the code scanning module switching control can be a control, and working states of the first code scanning module and the second code scanning module can be controlled by using the control. The code scanning module switching control can be two controls, where the two controls can include a first code scanning module switching control used to start the first code scanning module, and can also include a second code scanning module switching control used to start the second code scanning module. The first code scanning module switching control can be operated to switch the first code scanning module to a state available for work, and a to-be-identified image can be captured by using the first code scanning module. The second code scanning module switching control can be operated to switch the second code scanning module to a state available for work, and a to-be-identified image can be captured by using the second code scanning module.

In some implementations, the method provided in some implementations of the present specification can further include: obtaining a module switching instruction, where the module switching instruction is generated based on an operation used for the code scanning module switching control; and enabling, based on the module switching instruction, the first code scanning module or the second code scanning module to perform code scanning identification.

In some implementations, the first code scanning module and the second code scanning module can both be in a state available for work, or one of the first code scanning module and the second code scanning module can be started to work at the same moment. An example manner can be set based on an actual requirement.

The display component in some implementations of the present specification can include an LCD display screen, configured to display information received by the code scanning tool. In some implementations, corresponding information obtained by performing an operation on a button in the code scanning tool can also be displayed on the display screen. For ease of user operation, the display component can further include a touch panel, so that a user can perform an operation on the code scanning tool by using the touch panel.

The second code scanning module in some implementations of the present specification can include a second camera. To improve a working effect of the second code scanning module, the second code scanning module can further include a light supplementation lamp, and the light supplementation lamp can be located on one side of the second camera, to supplement light to a photographing area of the second camera during working of the second code scanning module to obtain an image with high definition, thereby improving identification efficiency.

In some implementations, the code scanning identification method provided in some implementations of the present specification can further include: sending a light supplementation control signal to the light supplementation lamp based on a first acknowledgment instruction, so that the light supplementation lamp performs light supplementation.

For ease of use by a user, the second code scanning module can further include a positioning lamp, which can be located on the other side of the second camera, to position a to-be-identified image. The positioning lamp can be an infrared positioning lamp. In some implementations, the housing of the code scanning tool can include a through-hole configured to fasten components such as the light supplementation lamp and the positioning lamp, and can further include a through-hole used by the second camera to capture an image outside the code scanning tool. An example size of the through-hole can be set based on an actual requirement, which is not specifically limited herein.

In some implementations, the code scanning identification method provided in some implementations of the present specification can further include: sending a positioning control signal to the positioning lamp based on the first acknowledgment instruction, so that the positioning lamp emits positioning light.

In consideration of actual application, when a first user such as a consumer performs payment, the first user usually has a relatively short distance from the code scanning tool, or the first user can put an image such as a displayed payment code close to the code scanning tool for identification. However, when a second user such as a salesperson performs operations such commodity stock-in and commodity stock-out, the second user is more accustomed to holding a mobile code scanning tool to identify a barcode on a commodity. To facilitate use by different users, in some implementations of the present specification, when the code scanning tool is placed on a fixed placement surface such as a desktop, the first code scanning module can be used to obtain an image. When a user holds the code scanning tool to perform code scanning, the second code scanning module can be used to obtain an image. A field of view (FOV) of the first camera can be greater than or equal to a field of view of the second camera.

In some implementations, in some implementations of the present specification, the field of view of the first camera can range from 85 to 120 degrees, and a code scanning distance of the first camera can range from 0 to 15 centimeters. The field of view of the second camera can range from 30 to 45 degrees, and a code scanning distance of the second camera can range from 5 to 40 centimeters. In some implementations, the camera can be set based on an actual requirement, which is not specifically limited herein.

The code scanning tool in some implementations of the present specification can further include a subscriber identity module (SIM) card slot, which can be configured to place a SIM card, and can be located on a side surface of the code scanning tool. The housing of the code scanning tool can further include several through-holes, and the through-holes can correspond to speakers located inside the code scanning tool, to spread sounds played by the speakers.

In some implementations, the code scanning identification method provided in some implementations of the present specification can further include: sending a broadcast instruction to a speaker, so that the speaker performs broadcasting.

In some implementations, the speaker can broadcast information indicating a result of code scanning identification, such as information indicating that code scanning succeeds, or information indicating that code scanning fails.

The code scanning tool provided in some implementations of the present specification can further include an anti-slip pad. The anti-slip pad can be located on an outer surface at the bottom of the code scanning tool. The anti-slip pad can be fastened to a part of an outer surface at the bottom that is in contact with a placement surface and can be separately fastened to an upper bottom and a lower bottom.

The code scanning tool in some implementations of the present specification can further include a power on/off button, and the power on/off button can be located on a side surface of the code scanning tool. The code scanning tool in some implementations of the present specification can further include a data interface, which can be located at the bottom of the code scanning tool, to connect the code scanning tool to another device. The data interface can include a waterproof Type-c interface, which can be configured to charge the code scanning tool or can perform data transmission. In some implementations, components such as the power on/off button, the SIM card slot, and the data interface can be respectively located on different side surfaces of the code scanning tool, or can be located on the same side surface. An example position can be set based on an actual requirement, which is not specifically limited herein.

In some implementations, the code scanning identification method provided in some implementations of the present specification can further include: obtaining a to-be-identified image captured by the first code scanning module or the second code scanning module; parsing the to-be-identified image to obtain parsed information; and sending the parsed information to a server. The server can perform service processing based on the parsed information, for example, can perform payment service processing, commodity stock-in/stock-out processing, etc.

In some implementations, the code scanning identification method in some implementations of the present specification can further include: obtaining a service processing result sent by the server.

To help a user hold the code scanning tool, a bottom housing of the code scanning tool provided in some implementations of the present specification can be a housing that is wide at the top and narrow at the bottom. A bottom surface can also have a determined radian, so that the bottom surface can be fit into a palm when the code scanning tool is held. A determined radian angle can also be set on edges of a bottom surface in the bottom housing that are connected to side surfaces around the bottom surface, so that the bottom surface is smoothly connected to the side surfaces.

In some implementations of the present specification, the first code scanning module can include a first camera control module, configured to control the first camera to capture an image; and the second code scanning module can include a second camera control module, configured to control the second camera to capture an image. The control modules can be connected to the first camera control module and the second camera control module.

In some implementations of the present specification, the first code scanning module can process a to-be-identified image including a two-dimensional code, and the second code scanning module can process a to-be-identified image including a one-dimensional code. To improve identification accuracy, the code scanning tool in some implementations of the present specification can include a first decoding unit, where the first decoding unit is connected to the first code scanning module and can be configured to parse a first to-be-identified image captured by the first code scanning module.

The code scanning tool provided in some implementations of the present specification can further include a second decoding unit, where the second decoding unit can be connected to the second code scanning module to parse a second to-be-identified image captured by the second code scanning module. Computing power of the second decoding unit can be greater than or equal to computing power of the first decoding unit.

In some implementations of the present specification, two decoding units are used to respectively process the to-be-identified images obtained by the first code scanning module and the second code scanning module, which does not need to consider compatibility of a decoding chip, and can also reduce costs of the code scanning tool.

In some implementations, in some implementations of the present specification, the parsed information can include first parsed information provided by the first decoding unit and/or second parsed information provided by the second decoding unit.

To facilitate use of the code scanning tool, the code scanning tool in some implementations of the present specification can further include a communication module, which can be configured to send image parsing information to a server or another information processing device.

In some implementations, the communication module can include a wireless communication module, such as a Bluetooth module, a WiFi (wireless network) module, a radio frequency identification (RFID) module, and a mobile communication module.

Figure 3:
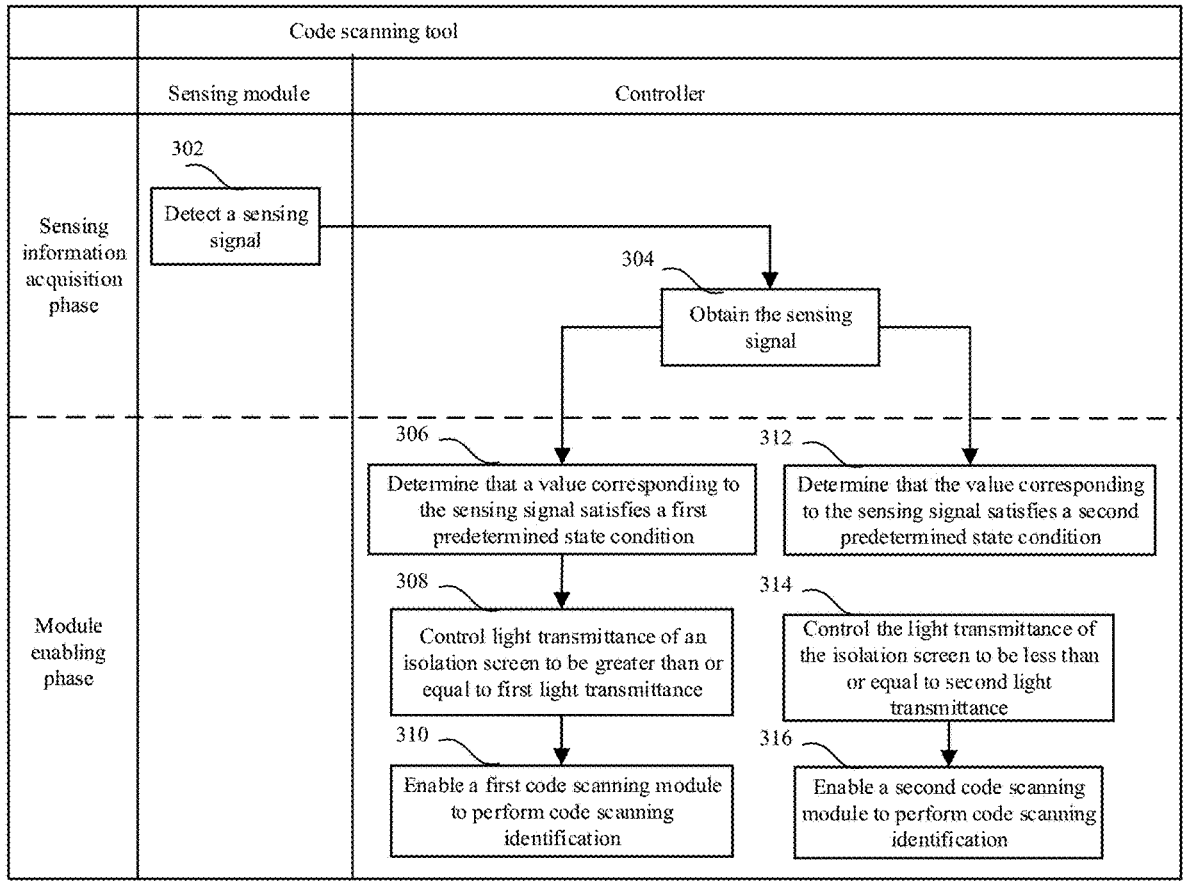
FIG. 3 is a swimlane diagram illustrating a code scanning identification method according to an implementation of the present specification.

To describe the code scanning identification method provided in the implementations of the present specification more clearly, FIG. 3 is a swimlane diagram illustrating a code scanning identification method according to an implementation of the present specification. As shown in FIG. 3, the method can include a sensing information acquisition phase and a module start phase, and can include the following operations: Operation 302: A sensing module in a code scanning tool detects a sensing signal.

Operation 304: A controller obtains the sensing signal detected by the sensing module.

Operation 306: Determine, based on the sensing signal detected by the sensing module, that a value corresponding to the sensing signal satisfies a first determined state condition. The first determined state condition can indicate a condition for enabling a first code scanning module.

Operation 308: Control light transmittance of an isolation screen to be greater than or equal to first light transmittance when it is determined that the value corresponding to the sensing signal satisfies the first determined state condition, so that light outside the code scanning tool can enter a camera of the first code scanning module.

Operation 310: Enable the first code scanning module to perform code scanning identification when it is determined that the value corresponding to the sensing signal satisfies the first determined state condition.

Operation 312: Determine, based on the sensing signal detected by the sensing module, that the value corresponding to the sensing signal satisfies a second determined state condition. The second determined state condition can indicate a condition for enabling a second code scanning module.

Operation 314: Control the light transmittance of the isolation screen to be less than or equal to second light transmittance when it is determined that the value corresponding to the sensing signal satisfies the second determined state condition, to prevent light outside the code scanning tool from entering the camera of the first code scanning module. A code scanning port corresponding to the first code scanning module can be displayed in a black or dark color, which can prompt a user that the code scanning port is unavailable.

Operation 316: Enable the second code scanning module to perform code scanning identification when it is determined that the value corresponding to the sensing signal satisfies the second determined state condition.

Based on the same concepts, the implementations of the present specification further provide an apparatus corresponding to the previous method. The apparatus can be applied to a code scanning tool. The code scanning tool includes a code scanning part and a handheld part, the code scanning part includes a first code scanning module and a second code scanning module, a first angle is formed between a first top surface of the code scanning part in which the first code scanning module is located and a second top surface of the handheld part, one side of the first top surface is connected to the second top surface, another side opposite to the one side of the first top surface is connected to a first side surface of the code scanning part, the second code scanning module is disposed on the first side surface of the code scanning part, and the code scanning tool further includes a sensing module.

Figure 4:
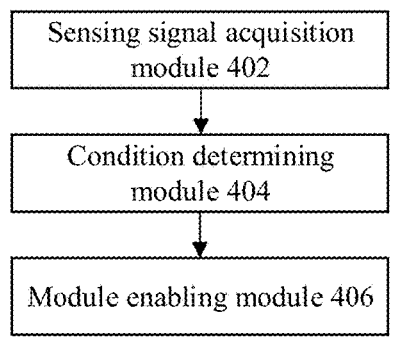
FIG. 4 is a schematic diagram illustrating a structure of a code scanning identification apparatus according to an implementation of the present specification.

FIG. 4 is a schematic diagram illustrating a structure of a code scanning identification apparatus according to an implementation of the present specification. As shown in FIG. 4, the apparatus can include: a sensing signal acquisition module 402, configured to obtain a sensing signal obtained by the sensing module through detection; a condition determining module 404, configured to determine whether a value corresponding to the sensing signal satisfies a determined state condition, to obtain a determining result, where the determined state condition includes a theoretical value range corresponding to the sensing signal obtained by the sensing module through detection when the code scanning tool is in a target working mode; and a scanning module enabling module 406, configured to enable a code scanning module corresponding to the target working mode to perform code scanning identification when the determining result indicates that the value corresponding to the sensing signal satisfies the determined state condition, where the code scanning module corresponding to the target working mode is the first code scanning module or the second code scanning module.

Based on the same idea, the implementations of the present specification further provide a device corresponding to the previous method. The device is applied to a code scanning tool. The code scanning tool includes a code scanning part and a handheld part, the code scanning part includes a first code scanning module and a second code scanning module, a first angle is formed between a first top surface of the code scanning part in which the first code scanning module is located and a second top surface of the handheld part, one side of the first top surface is connected to the second top surface, another side opposite to the one side of the first top surface is connected to a first side surface of the code scanning part, the second code scanning module is disposed on the first side surface of the code scanning part, and the code scanning tool further includes a sensing module.

Figure 5:
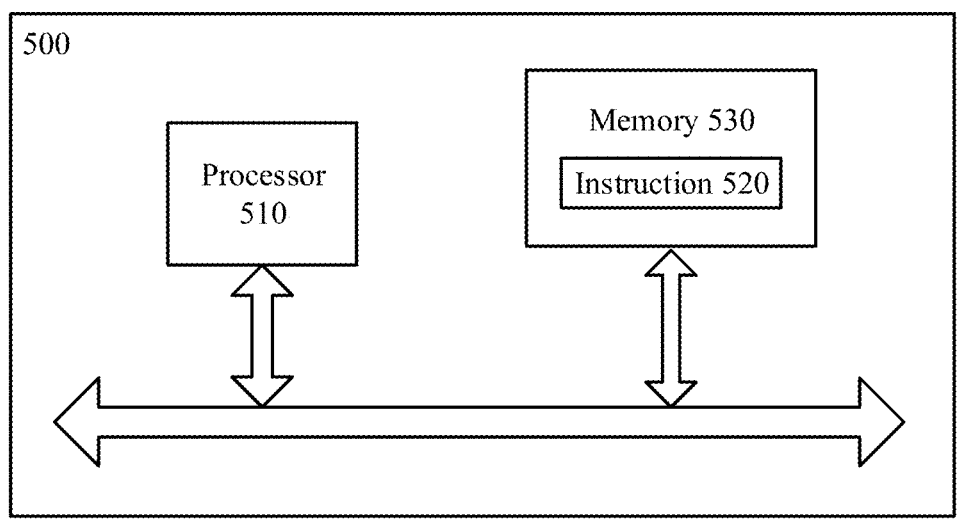
FIG. 5 is a schematic diagram illustrating a structure of a code scanning identification device according to an implementation of the present specification.

FIG. 5 is a schematic diagram illustrating a structure of a code scanning identification device according to an implementation of the present specification. As shown in FIG. 5, the device 500 can include at least one processor 510 and a memory 530 communicatively connected to the at least one processor. The memory 530 stores instructions 520 that can be executed by the at least one processor 510, and the instructions are executed by the at least one processor 510 to enable the at least one processor 510 to: obtain a sensing signal obtained by the sensing module through detection; determine whether a value corresponding to the sensing signal satisfies a determined state condition, to obtain a determining result, where the determined state condition includes a theoretical value range corresponding to the sensing signal obtained by the sensing module through detection when the code scanning tool is in a target working mode; and enable a code scanning module corresponding to the target working mode to perform code scanning identification when the determining result indicates that the value corresponding to the sensing signal satisfies the determined state condition, where the code scanning module corresponding to the first working mode is the first code scanning module or the second code scanning module.

Based on the same idea, the implementations of the present specification further provide a computer-readable medium corresponding to the previous method. The computer-readable medium stores computer-readable instructions, and the computer-readable instructions can be executed by a processor to implement the above code scanning identification method. The implementations in the present specification are described in a progressive way. For same or similar parts of the implementations, mutual references can be made to the implementations. Each implementation focuses on a difference from other implementations. Particularly, the device shown in FIG. 5 is similar to the method implementation, and therefore is described briefly. For related parts, references can be made to related descriptions in the method implementation.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, this type of programming is mostly implemented by using "logic compiler" software. The software is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the some described hardware description languages and is programmed into an integrated circuit.

A controller can be implemented by using any appropriate method. For example, the controller can be a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or an embedded microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using only the computer-readable program code, logic programming can be performed on method operations to enable the controller to implement the same function in forms of the logic gate, the switch, the application-specific integrated circuit, the programmable logic controller, the embedded microcontroller, etc. Therefore, the controller can be considered as a hardware component, and an apparatus included in the controller for implementing various functions can also be considered as a structure in the hardware component. Alternatively or additionally, the apparatus configured to implement various functions can even be considered as both a software module implementing the method and a structure in the hardware component.

Systems, apparatuses, modules, or units that are described in the above implementations can be for example implemented by using a computer chip or an entity, or by using a product with a certain function. A typical implementation device is a computer. Specifically, the computer can be, for example, a personal computer, a laptop computer, a cellular phone, a camera phone, a smartphone, a personal digital assistant, a media player, a navigation device, an email receiving and sending device, a game console, a tablet computer, a wearable device, or any combination of these devices.

For ease of description, the apparatus above is described by dividing functions into various units. Certainly, when the present application is implemented, a function of each unit can be implemented in one or more pieces of software and/or hardware.

A person skilled in the art should understand that the implementations of the present invention can be provided as a method, a system, or a computer program product. Therefore, the present invention can use a form of hardware only implementations, software only implementations, or implementations with a combination of software and hardware. Moreover, the present invention can use a form of a computer program product that is implemented on one or more computer-usable storage media (including but not limited to a disk memory, a CD-ROM, an optical memory, etc.) that include computer-usable program code.

The present invention is described with reference to the flowcharts and/or block diagrams of the method, the device (system), and the computer program product according to the implementations of the present invention. It should be understood that computer program instructions can be used to implement each procedure and/or each block in the flowcharts and/or the block diagrams and a combination of a procedure and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions can be stored in a computer-readable memory that can instruct the computer or the another programmable data processing device to work in a specific way, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions can be loaded onto the computer or the another programmable data processing device, so that a series of operations and operations are performed on the computer or the another programmable device, thereby generating computer-implemented processing. Therefore, the instructions executed on the computer or the another programmable device provide operations for implementing a specific function in one or more procedures in the flowcharts and/or in one or more blocks in the block diagrams.

In a typical configuration, a computing device includes one or more central processing units (CPU), input/output interfaces, network interfaces, and memories.

The memory can include a non-persistent memory, a random access memory (RAM), a non-volatile memory, and/or another form that are in a computer-readable medium, for example, a read-only memory (ROM) or a flash memory (flash RAM). The memory is an example of the computer-readable medium.

The computer-readable medium includes a persistent and a non-persistent, a removable and a non-removable medium, which implement information storage by using any method or technology. The information can be a computer-readable instruction, a data structure, a program module, or other data. Examples of the computer storage medium include but are not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a cassette, and a cassette magnetic disk storage, or another magnetic storage device or any other non-transmission medium. The computer storage medium can be configured to store information that can be accessed by a computing device. As described in the present specification, the computer-readable medium does not include transitory media such as a modulated data signal and a carrier.

It should be further noted that, the terms "include", "comprise", or their any other variants are intended to cover a non-exclusive inclusion, so that a process, a method, a product, or a device that includes a list of elements not only includes those elements but also includes other elements which are not expressly listed, or further includes elements inherent to such a process, method, product, or device. Without more constraints, an element preceded by "includes a . . . " does not preclude the existence of additional identical elements in the process, method, product, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. Moreover, the present application can use a form of a computer program product that is implemented on one or more computer-usable storage media (including but not limited to a disk memory, a CD-ROM, an optical memory, etc.) that include computer-usable program code.

The present application can be described in the general context of computer-executable instructions, for example, a program module. Generally, the program module includes a routine, a program, an object, a component, a data structure, etc. executing a specific task or implementing a specific abstract data type. The present application can alternatively or additionally be practiced in distributed computing environments in which tasks are performed by remote processing devices that are connected through a communication network. In the distributed computing environments, the program module can be located in a local and remote computer storage medium including a storage device.

The previous descriptions are merely implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

What is claimed is:

1. A code scanning identification method, comprising:
   obtaining a sensing signal through a code scanning tool, the code scanning tool including a code scanning part and a handheld part, the code scanning part including a first code scanning module and a second code scanning module, a first angle being formed between a first top surface of the code scanning part in which the first code scanning module is located and a second top surface of the handheld part, a first side of the first top surface being connected to the second top surface, a second side of the first top surface opposite to the first side of the first top surface meeting a first side surface of the code scanning part, the second code scanning module being disposed on the first side surface of the code scanning part, and the code scanning tool including a sensing module;
   determining whether a value corresponding to the sensing signal satisfies a state condition, to obtain a determining result, the state condition comprising a theoretical value range corresponding to the sensing signal obtained by the sensing module through detection in response to that the code scanning tool is in a target working mode; and
   enabling a code scanning module corresponding to the target working mode to perform code scanning identification in response to that the determining result indicates that the value corresponding to the sensing signal satisfies the state condition, the code scanning module corresponding to the target working mode being the first code scanning module or the second code scanning module.

2. The method according to claim 1, wherein the code scanning module corresponding to the target working mode is the first code scanning module, and the sensing module includes an acceleration sensor;
   the determining whether the value corresponding to the sensing signal satisfies the state condition includes:
      determining whether an acceleration value obtained by the acceleration sensor through detection is less than or equal to a first acceleration threshold; and
   the enabling the code scanning module corresponding to the target working mode to perform code scanning identification in response to that the determining result indicates that the value corresponding to the sensing signal satisfies the state condition includes:
      enabling the first code scanning module to perform code scanning identification in response to that the acceleration value obtained by the acceleration sensor through detection is less than or equal to the first acceleration threshold.

3. The method according to claim 1, wherein the code scanning module corresponding to the target working mode is the first code scanning module, and the sensing module includes a pressure sensor;
   the determining whether the value corresponding to the sensing signal satisfies the state condition includes;
      determining whether a pressure value obtained by the pressure sensor through detection is greater than or equal to a first pressure threshold; and
   the enabling the code scanning module corresponding to the target working mode to perform code scanning identification in response to that the determining result indicates that the value corresponding to the sensing signal satisfies the state condition includes:
      enabling the first code scanning module to perform code scanning identification in response to that the pressure value obtained by the pressure sensor through detection is greater than or equal to the first pressure threshold.

4. The method according to claim 1, wherein the code scanning module corresponding to the target working mode is the first code scanning module, and the sensing module includes a temperature sensor;
   the determining whether the value corresponding to the sensing signal satisfies the state condition includes:
      determining whether a temperature value obtained by the temperature sensor through detection is less than or equal to a first temperature threshold; and
   the enabling the code scanning module corresponding to the target working mode to perform code scanning identification in response to that the determining result indicates that the value corresponding to the sensing signal satisfies the condition includes:
      enabling the first code scanning module to perform code scanning identification in response to that the temperature value obtained by the temperature sensor through detection is less than or equal to the first temperature threshold.

5. The method according to claim 1, wherein the code scanning module corresponding to the target working mode is the first code scanning module, and the sensing module includes a distance sensor;
the determining whether the value corresponding to the sensing signal satisfies the state condition includes:
determining whether a distance value obtained by the distance sensor through detection is less than or equal to a first distance threshold; and
the enabling the code scanning module corresponding to the target working mode to perform code scanning identification in response to that the determining result indicates that the value corresponding to the sensing signal satisfies the state condition includes:
enabling the first code scanning module to perform code scanning identification in response to that the distance value obtained by the distance sensor through detection is less than or equal to the first distance threshold.

6. The method according to claim 1, wherein the code scanning module corresponding to the target working mode is the first code scanning module, and the sensing module includes an angle sensor;
the determining whether the value corresponding to the sensing signal satisfies the state condition includes:
determining whether an angle value obtained by the angle sensor through detection is less than or equal to a first angle threshold; and
the enabling the code scanning module corresponding to the target working mode to perform code scanning identification in response to that the determining result indicates that the value corresponding to the sensing signal satisfies the state condition includes:
enabling the first code scanning module to perform code scanning identification in response to that the angle value obtained by the angle sensor through detection is less than or equal to the angle threshold.

7. The method according to claim 1, wherein the code scanning module corresponding to the target working mode is the second code scanning module, and the sensing module includes an acceleration sensor;
the determining whether the value corresponding to the sensing signal satisfies the state condition includes:
determining whether an acceleration value obtained by the acceleration sensor through detection is greater than or equal to a second determined acceleration threshold; and
the enabling the code scanning module corresponding to the target working mode to perform code scanning identification in response to that the determining result indicates that the value corresponding to the sensing signal satisfies the state condition includes:
enabling the second code scanning module to perform code scanning identification in response to that the acceleration value obtained by the acceleration sensor through detection is greater than or equal to the second acceleration threshold.

8. The method according to claim 1, wherein the code scanning module corresponding to the target working mode is the second code scanning module, and the sensing module includes a pressure sensor;
the determining whether the value corresponding to the sensing signal satisfies the state condition includes:
determining whether a pressure value obtained by the pressure sensor through detection is less than or equal to a second pressure threshold; and
the enabling the code scanning module corresponding to the target working mode to perform code scanning identification in response to that the determining result indicates that the value corresponding to the sensing signal satisfies the state condition includes:
enabling the second code scanning module to perform code scanning identification in response to that the pressure value obtained by the pressure sensor through detection is less than or equal to the second determined pressure threshold.

9. The method according to claim 1, wherein the code scanning module corresponding to the target working mode is the second code scanning module, and the sensing module includes a temperature sensor;
the determining whether the value corresponding to the sensing signal satisfies the state condition includes:
determining whether a temperature value obtained by the temperature sensor through detection is greater than or equal to a second temperature threshold; and
the enabling the code scanning module corresponding to the target working mode to perform code scanning identification in response to that the determining result indicates that the value corresponding to the sensing signal satisfies the state condition includes:
enabling the second code scanning module to perform code scanning identification in response to that the temperature value obtained by the temperature sensor through detection is greater than or equal to the second temperature threshold.

10. The method according to claim 1, wherein the code scanning module corresponding to the target working mode is the second code scanning module, and the sensing module includes a distance sensor;
the determining whether the value corresponding to the sensing signal satisfies the state condition includes:
determining whether a distance value obtained by the distance sensor through detection is greater than or equal to a second determined distance threshold; and
the enabling the code scanning module corresponding to the target working mode to perform code scanning identification in response to that the determining result indicates that the value corresponding to the sensing signal satisfies the state condition includes:
enabling the second code scanning module to perform code scanning identification in response to that the distance value obtained by the distance sensor through detection is greater than or equal to the second distance threshold.

11. The method according to claim 1, wherein the handheld part includes a button component, and the button component includes a first button; and
the enabling the code scanning module corresponding to the target working mode to perform code scanning identification includes:
obtaining a first acknowledgment instruction, wherein the first acknowledgment instruction is generated based on an operation performed by a user on the first button; and
enabling, based on the first acknowledgment instruction, the code scanning module corresponding to the target working mode to perform code scanning identification.

12. The method according to claim 1, wherein the code scanning tool further includes an isolation screen, and the isolation screen is located on the first top surface; and the method further includes:
after the obtaining the determining result, controlling light transmittance of the isolation screen in response to that the determining result indicates that the value corresponding to the sensing signal satisfies the state condition.

13. The method according to claim 12, wherein the code scanning module corresponding to the target working mode is the first code scanning module; and
the controlling the light transmittance of the isolation screen in response to that the determining result indicates that the value corresponding to the sensing signal satisfies the state condition includes:
controlling the light transmittance of the isolation screen to be greater than or equal to first light transmittance in response to that the determining result indicates that the value corresponding to the sensing signal satisfies the state condition, wherein the first light transmittance is greater than or equal to 60%.

14. The method according to claim 12, wherein the code scanning module corresponding to the target working mode is the first code scanning module; and
the controlling the light transmittance of the isolation screen in response to that the determining result indicates that the value corresponding to the sensing signal satisfies the state condition includes:
controlling the light transmittance of the isolation screen to be less than or equal to second light transmittance in response to that the determining result indicates that the value corresponding to the sensing signal satisfies the state condition, wherein the second light transmittance is less than or equal to 30%.

15. The method according to claim 1, wherein the code scanning tool further includes an indicator lamp, and the indicator lamp is located on the first top surface; and
the method further includes:
after the obtaining the determining result, controlling the indicator lamp to flash at a frequency in response to that the determining result indicates that the value corresponding to the sensing signal satisfies the state condition.

16. A code scanning identification system, comprising:
a code scanning tool, the code scanning tool including a code scanning part and a handheld part, the code scanning part including a first code scanning module and a second code scanning module, a first angle being formed between a first top surface of the code scanning part in which the first code scanning module is located and a second top surface of the handheld part, a first side of the first top surface being connected to the second top surface, a second side of the first top surface opposite to the first side of the first top surface meeting a first side surface of the code scanning part, the second code scanning module being disposed on the first side surface of the code scanning part, and the code scanning tool including a sensing module; and
a code scanning identification controller including:
a sensing signal acquisition module, configured to obtain a sensing signal obtained by the sensing module;
a condition determining module, configured to determine whether a value corresponding to the sensing signal satisfies a state condition, to obtain a determining result, the state condition comprising a theoretical value range corresponding to the sensing signal obtained by the sensing module through detection in response to that the code scanning tool is in a target working mode; and
a scanning module enabling module, configured to enable a code scanning module corresponding to the target working mode to perform code scanning identification in response to that the determining result indicates that the value corresponding to the sensing signal satisfies the state condition, the code scanning module corresponding to the target working mode being the first code scanning module or the second code scanning module.

17. The code scanning identification system according to claim 16, wherein the state condition includes a first state condition corresponding to the first code scanning module and a second state condition corresponding to the second code scanning module.

18. The code scanning identification system according to claim 16, wherein the sensing module includes one or more of an acceleration sensor, a temperature sensor, a pressure sensor, a distance sensor, or an angle sensor.

19. A code scanning identification device, the device being coupled to a code scanning tool, the code scanning tool including a code scanning part and a handheld part, the code scanning part including a first code scanning module and a second code scanning module, a first angle being formed between a first top surface of the code scanning part in which the first code scanning module is located and a second top surface of the handheld part, a first side of the first top surface being connected to the second top surface, a second side of the first top surface opposite to the first side of the first top surface meeting a first side surface of the code scanning part, the second code scanning module being disposed on the first side surface of the code scanning part, and the code scanning tool including a sensing module; and
the device comprising:
at least one processor; and
a memory communicatively connected to the at least one processor, the memory storing instructions that can be executed by the at least one processor, and the instructions are executed by the at least one processor to enable the at least one processor to, individually or collectively, perform acts including:
obtaining a sensing signal obtained by the sensing module through detection;
determining whether a value corresponding to the sensing signal satisfies a state condition, to obtain a determining result, the state condition comprising a theoretical value range corresponding to the sensing signal obtained by the sensing module through detection in response to that the code scanning tool is in a target working mode; and
enabling a code scanning module corresponding to the target working mode to perform code scanning identification in response to that the determining result indicates that the value corresponding to the sensing signal satisfies the state condition, the code scanning module corresponding to the first working mode being the first code scanning module or the second code scanning module.

20. The code scanning identification device according to claim 19, wherein the state condition includes a first state condition corresponding to the first code scanning module and a second state condition corresponding to the second code scanning module.

* * * * *